United States Patent
Vo

(10) Patent No.: US 9,512,350 B2
(45) Date of Patent: Dec. 6, 2016

(54) IN-SITU GENERATION OF ACID FOR USE IN SUBTERRANEAN FORMATION OPERATIONS

(71) Applicant: Halliburton Energy Services, Inc., Houston, TX (US)

(72) Inventor: Loan K. Vo, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 246 days.

(21) Appl. No.: 14/389,796

(22) PCT Filed: Nov. 7, 2013

(86) PCT No.: PCT/US2013/068942
§ 371 (c)(1),
(2) Date: Oct. 1, 2014

(87) PCT Pub. No.: WO2015/069261
PCT Pub. Date: May 14, 2015

(65) Prior Publication Data
US 2016/0289550 A1    Oct. 6, 2016

(51) Int. Cl.
*E21B 43/27* (2006.01)
*E21B 43/22* (2006.01)
(Continued)

(52) U.S. Cl.
CPC . *C09K 8/72* (2013.01); *C09K 8/54* (2013.01); *C09K 8/74* (2013.01); *C09K 8/80* (2013.01);
(Continued)

(58) Field of Classification Search
CPC ........ E21B 43/267; E21B 43/26; E21B 43/25; E21B 43/283; C09K 8/72; C09K 8/68; C09K 8/74
See application file for complete search history.

(56) References Cited

U.S. PATENT DOCUMENTS 4,105,759 A    8/1978 Schreiber et al.
4,859,467 A    8/1989 Grodberg et al.
(Continued)

FOREIGN PATENT DOCUMENTS

WO    2015069261 A1    5/2015

OTHER PUBLICATIONS

Fredd et al., "Experimental Study of Fracture Conductivity for Water-Fracturing and Conventional Fracturing Applications," SPE J.6 (3): 288-298, 2001.
(Continued)

*Primary Examiner* — Zakiya W Bates
(74) *Attorney, Agent, or Firm* — McDermott Will & Emery LLP; Tenley Krueger

(57) ABSTRACT

Embodiments herein include methods comprising introducing a treatment fluid into a subterranean formation, wherein the treatment fluid comprises a base fluid, an acid, and a fluoride releasing agent selected from the group consisting of an amine monofluorophosphate; a bisamine monofluorophosphate; any derivative thereof; and any combination thereof, wherein the acid and the fluoride releasing agent react to generate hydrofluoric acid over time in the subterranean formation so as to create or enhance at least one microfracture therein.

20 Claims, 1 Drawing Sheet

(51) Int. Cl.
*C09K 8/72* (2006.01)
*E21B 43/25* (2006.01)
*E21B 43/26* (2006.01)
*E21B 43/267* (2006.01)
*C09K 8/74* (2006.01)
*C09K 8/54* (2006.01)
*C09K 8/80* (2006.01)

(52) U.S. Cl.
CPC .............. *E21B 43/25* (2013.01); *E21B 43/26* (2013.01); *E21B 43/267* (2013.01); *C09K 2208/22* (2013.01); *C09K 2208/28* (2013.01); *C09K 2208/32* (2013.01)

(56) References Cited

U.S. PATENT DOCUMENTS

| | | | |
|---|---|---|---|
| 5,259,455 | A | 11/1993 | Nimerick et al. |
| 5,905,061 | A | 5/1999 | Patel |
| 5,977,031 | A | 11/1999 | Patel |
| 6,488,091 | B1 | 12/2002 | Weaver et al. |
| 6,828,279 | B2 | 12/2004 | Patel et al. |
| 7,004,255 | B2 | 2/2006 | Boney |
| 7,534,745 | B2 | 5/2009 | Taylor et al. |
| 7,654,723 | B2 | 2/2010 | Chang |
| 7,696,131 | B2 | 4/2010 | Oyler et al. |
| 2001/0005502 | A1 | 6/2001 | Foster et al. |
| 2007/0135314 | A1* | 6/2007 | Frenier .................... C09K 8/52 507/260 |
| 2008/0035342 | A1 | 2/2008 | Saini et al. |
| 2009/0042748 | A1 | 2/2009 | Fuller |
| 2014/0318786 | A1* | 10/2014 | Vidma .................. C09K 8/665 166/293 |

OTHER PUBLICATIONS

Warpinski et al., "Stimulating Unconventional Reservoirs: Maximizing Network Growth While Optimizing Fracture Conductivity," SPE 114173, 2008.
Warpinski, N.R., "Stress Amplification and Arch Dimensions in Proppant Beds Deposited by Waterfracs," SPE 119350, 2010.
International Search Report and Written Opinion for PCT/US2013/068942 dated Aug. 19, 2014.

* cited by examiner

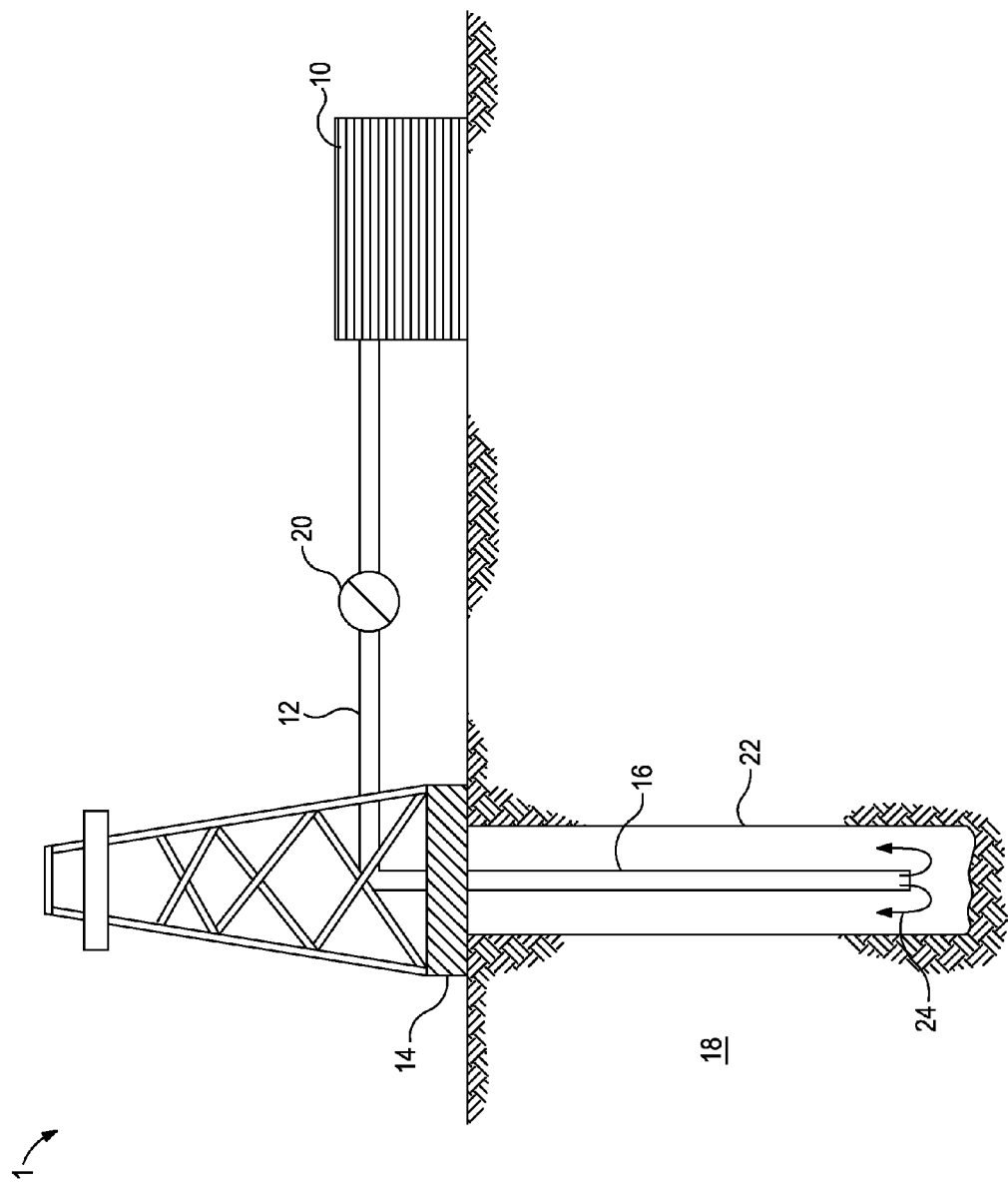

IN-SITU GENERATION OF ACID FOR USE IN SUBTERRANEAN FORMATION OPERATIONS

BACKGROUND

The embodiments herein relate to in-situ generation of acid for use in subterranean formation operations.

Subterranean wells (e.g., hydrocarbon producing wells) are often stimulated by hydraulic fracturing treatments. In traditional hydraulic fracturing treatments, a viscous treatment fluid is pumped into a portion of a subterranean formation at a rate and pressure such that the subterranean formation breaks down and one or more fractures are formed. While the treatment fluid used to initiate the fracture is generally solids-free, typically, particulate solids, such as graded sand, are suspended in a later portion of the treatment fluid and then deposited into the fractures. These particulate solids, or "proppant particulates," serve to prop the fracture open (e.g., keep the fracture from fully closing) after the hydraulic pressure is removed. By keeping the fracture from fully closing, the proppant particulates aid in forming conductive paths through which produced fluids, such as hydrocarbons, may flow. As used herein, the term proppant particulates includes "proppant aggregates" defined as coherent body that does not generally become dispersed into smaller bodies without the application of shear.

The degree of success of a fracturing operation depends, at least in part, upon fracture conductivity once the fracturing operation is complete and production is begun. In order to enhance production, in some subterranean treatment operations, traditional fracturing operations may be supplemented with enhanced oil recovery techniques. Such enhanced oil recovery techniques may operate to enhance the conductivity of fractures propped with proppant particulates. One such technique is acidizing a fracture. Acidizing involves injecting an acid (e.g., hydrochloric acid, hydrofluoric acid, and the like) into a portion of a subterranean formation (e.g., into or adjacent to a fraction) in order to create microfractures in the face of the subterranean formation. The acid may create a dendritic-like network of microfractures through which treatment fluids and produced fluids may flow. Another example of an enhanced oil recovery technique is fracture-acidizing, in which an acid is injected into a formation above the formation fracture gradient in order to fracture the formation and simultaneously etch microfractures in the face of the fracture in a non-uniform pattern such that the microfractures remain open after the pressure is removed and the fracture closes.

BRIEF DESCRIPTION OF THE DRAWINGS

The following figures are included to illustrate certain aspects of the embodiments, and should not be viewed as exclusive embodiments. The subject matter disclosed is capable of considerable modifications, alterations, combinations, and equivalents in form and function, as will occur to those skilled in the art and having the benefit of this disclosure.

FIG. 1 depicts an embodiment of a system configured for delivering the treatment fluids of the embodiments described herein to a downhole location.

DETAILED DESCRIPTION

The embodiments herein relate to in-situ generation of acid for use in subterranean formation operations. Specifically, the embodiments herein relate to controlled fluoride releasing agents that react with acids to generate controlled release in-situ hydrofluoric acid over a prolonged period of time for acidizing or fracture-acidizing a subterranean formation. The presence of the in situ hydrofluoric acid may permit the creation of microfractures within a desired interval of the subterranean formation, such as a fracture. As used herein, the term "microfracture" refers to a discontinuity in a portion of the subterranean formation (e.g., a fracture) such that an etch is created in the formation. Microfractures may be channels, perforations, holes, or other ablations within the formation. The microfractures created by the hydrofluoric acid in some embodiments herein may increase the conductivity of a fracture and the overall productivity of a subterranean formation.

Although some embodiments described herein are illustrated by reference to acidizing treatments and fracture-acidizing, the treatment fluid compositions disclosed herein may be used in any subterranean formation operation that may benefit from the presence of a controlled release acid. Such treatment operations may include, but are not limited to, a drilling operation; a stimulation operation; a hydraulic stimulation operation; a sand control operation; a completion operation; a scale inhibiting operation; a water-blocking operation; a clay stabilizer operation; a fracturing operation; a frac-packing operation; a gravel packing operation; a wellbore strengthening operation; a sag control operation; and any combination thereof. Furthermore, the embodiments described herein may be used in full-scale subterranean operations or pills. As used herein, the term "pill" refers to a relatively small volume of specially prepared fluid (e.g., drilling fluid) placed or circulated in a wellbore. The subterranean formation may be any source rock comprising organic matter (e.g., oil or natural gas), such as shale, sandstone, or limestone and may be subsea.

Moreover, the treatment fluid compositions described herein may be used in any non-subterranean operation that may benefit from the presence of a controlled release acid. Such operations may be performed in any industry including, but not limited to, oil and gas, mining, chemical, pulp and paper, aerospace, medical, automotive, and the like.

One or more illustrative embodiments disclosed herein are presented below. Not all features of an actual implementation are described or shown in this application for the sake of clarity. It is understood that in the development of an actual embodiment incorporating the embodiments disclosed herein, numerous implementation-specific decisions must be made to achieve the developer's goals, such as compliance with system-related, lithology-related, business-related, government-related, and other constraints, which vary by implementation and from time to time. While a developer's efforts might be complex and time-consuming, such efforts would be, nevertheless, a routine undertaking for those of ordinary skill the art having benefit of this disclosure.

It should be noted that when "about" is provided herein at the beginning of a numerical list, the term modifies each number of the numerical list. In some numerical listings of ranges, some lower limits listed may be greater than some upper limits listed. One skilled in the art will recognize that the selected subset will require the selection of an upper limit in excess of the selected lower limit. Unless otherwise indicated, all numbers expressing quantities of ingredients, properties such as molecular weight, reaction conditions, and so forth used in the present specification and associated claims are to be understood as being modified in all instances by the term "about." Accordingly, unless indicated to the contrary, the numerical parameters set forth in the following specification and attached claims are approximations that may vary depending upon the desired properties sought to be obtained by the exemplary embodiments described herein. At the very least, and not as an attempt to limit the application of the doctrine of equivalents to the scope of the claim, each numerical parameter should at least be construed in light of the number of reported significant digits and by applying ordinary rounding techniques.

While compositions and methods are described herein in terms of "comprising" various components or steps, the compositions and methods can also "consist essentially of" or "consist of" the various components and steps. When "comprising" is used in a claim, it is open-ended.

Some embodiments described herein provide a method of introducing a treatment fluid into a subterranean formation, the treatment fluid comprising a base fluid, an acid, and a fluoride releasing agent selected from the group consisting of an amine monofluorophosphate; a bisamine monofluorophosphate; any derivative thereof; and any combination thereof. As used herein, the term "derivative" is defined herein as any compound that is made from one of the listed compounds, for example, by replacing one atom in one of the listed compounds with another atom or group of atoms, ionizing one of the listed compounds, or creating a salt of one of the listed compounds. The acid and the fluoride releasing agent react together so as to generate hydrofluoric acid over time in the subterranean formation to create or enhance at least one microfracture therein. In some embodiments, the treatment fluid may be introduced into the subterranean formation at a rate and pressure sufficient to create or enhance at least one fracture therein. The acid and the fluoride releasing agent react to slowly generate hydrofluoric acid such that it may be present to etch microfractures into the subterranean formation over a prolonged period and may be present over a length of wellbore. In some embodiments, the acid and the fluoride releasing agent may react so as to generate long-term availability of hydrofluoric acid for up to about 72 hours.

In some embodiments, the acid and the fluoride releasing agent may react to create or enhance microfractures within a larger fracture in a subterranean formation. Such fractures may be naturally present in the subterranean formation or may be created by subterranean formation operations, such as hydraulic fracturing. In those embodiments where the fractures are naturally present in the formation, the embodiments described herein may enhance the already present fractures by creating or enhancing a network of microfractures (e.g., a dendritic-like microfracture structure). In other embodiments, the fractures may be created with any fluid, including the treatment fluids described herein, by pumping such fluids at or above the fracture gradient through perforations extending from the wellbore into the formation. In some cases, the perforations extend through a cement sheath separating the wellbore from the formation. Perforations may be formed using generally circular-shaped charges, slot-shaped charges, or any other shaped charge. As used herein, the term "slot" refers to a quadrilateral shape having two directions, where one direction is longer than the other (e.g., a rectangle). Perforations may also be formed using a hydrojetting tool.

Some embodiments described herein involve the placement of two treatment fluids into a subterranean formation, a first treatment fluid comprising a base fluid and an acid and a second treatment fluid comprising a base fluid and a fluoride releasing agent selected from the group consisting of an amine monofluorophosphate; a bisamine monofluorophosphate; any derivative thereof; and any combination thereof. The first or second treatment fluid is introduced into the subterranean formation in any order. Upon mixing in the subterranean formation, the acid and the fluoride releasing agent react slowly to generate hydrofluoric acid over time therein. The hydrofluoric acid may act to create or enhance at least one fracture in the subterranean formation. In some embodiments, the first and/or second treatment fluid may be introduced into the subterranean formation at a rate and pressure sufficient to create or enhance at least one fracture therein. In some embodiments, the first and second treatment fluid may be mixed together just prior to their introduction into the subterranean formation.

When two treatment fluids are used in accordance with the embodiments herein, the first and second treatment fluids may be introduced into the subterranean formation using a hydrojetting tool. The hydrojetting tool may be attached to a tubular member through which fluids may flow. Use of the hydrojetting tool may be beneficial to prevent mixing of the first and second treatment fluid (i.e. the acid and the fluoride releasing agent) until reaching a desired treatment interval. This is so because the first or second treatment fluid may be introduced through the hydrojetting tool (i.e., within the tubular member) and the other treatment fluid may be introduced directly into the wellbore in the annulus formed between the subterranean formation and the tubular member of the hydrojetting tool. For example, in some embodiments, the first treatment fluid comprising a base fluid and an acid is introduced into the subterranean formation through the hydrojetting tool and the second treatment fluid comprising a base fluid and a fluoride releasing agent is introduced into the subterranean formation in the annulus formed between the tubular member of the hydrojetting tool and the subterranean formation. In other embodiments, the first treatment fluid comprising a base fluid and an acid is introduced into the subterranean formation in the annulus formed between the tubular member of the hydrojetting tool and the subterranean formation and the second treatment fluid comprising a base fluid and a fluoride releasing agent is introduced into the subterranean formation through the hydrojetting tool. The first and second treatment fluid may then be contacted within the subterranean formation at a desired treatment interval therein, where the acid and the fluoride releasing agent react and generate hydrofluoric acid slowly over time to create or enhance at least one microfracture in the subterranean formation (e.g., in a fracture). In some embodiments, the steps of introducing the first and second treatment fluid through the hydrojetting tool and the annulus between the tubular member and the subterranean formation and contacting the first and second treatment fluid therein may be repeated at one or more additional treatment intervals.

Suitable base fluids for use in the treatment fluids described herein may include, but are not limited to, an aqueous base fluid, an aqueous-miscible fluid, a water-in-oil emulsion, an oil-in-water emulsion; and any combination thereof. Suitable aqueous-based fluids may include fresh water; saltwater (e.g., water containing one or more salts dissolved therein); brine (e.g., saturated salt water); seawater; and any combination thereof. Generally, the aqueous base fluid may be from any source (e.g., produced water) provided that it does not contain constituents that may adversely affect the acid and/or fluoride releasing agents described herein. Suitable aqueous-miscible fluids may include, but not be limited to, an alcohol (e.g., methanol, ethanol, n-propanol, isopropanol, n-butanol, sec-butanol, isobutanol, and t-butanol); a glycerin; a glycol (e.g., polyglycols, propylene glycol, and ethylene glycol); a polyglycol amine; a polyol; any derivative thereof; any in combination with a salt (e.g., sodium chloride, calcium chloride, calcium bromide, zinc bromide, potassium carbonate, sodium formate, potassium formate, cesium formate, sodium acetate, potassium acetate, calcium acetate, ammonium acetate, ammonium chloride, ammonium bromide, sodium nitrate, potassium nitrate, ammonium nitrate, ammonium sulfate, calcium nitrate, sodium carbonate, and potassium carbonate); any in combination with an aqueous base fluid; and any combination thereof. Suitable water-in-oil and oil-in-water emulsions may comprise any suitable aqueous base fluid and/or aqueous-miscible for use in the embodiments herein, including those described herein, and an oil including, but not limited to, an alkane; an olefin; an aromatic organic compound; a cyclic alkane; a paraffin; a diesel fluid; a mineral oil; a desulfurized hydrogenated kerosene; and any combination thereof. Suitable water-in-oil emulsions, also known as invert emulsions, may have an oil-to-water ratio from a lower limit of greater than about 50:50, 55:45, 60:40, 65:35, 70:30, 75:25, or 80:20 to an upper limit of less than about 100:0, 95:5, 90:10, 85:15, 80:20, 75:25, 70:30, or 65:35 by volume in the base fluid, where the amount may range from any lower limit to any upper limit and encompass any subset therebetween. Suitable oil-in-water emulsions may have a water-to-oil ratio from a lower limit of greater than about 50:50, 55:45, 60:40, 65:35, 70:30, 75:25, or 80:20 to an upper limit of less than about 100:0, 95:5, 90:10, 85:15, 80:20, 75:25, 70:30, or 65:35 by volume in the base fluid, where the amount may range from any lower limit to any upper limit and encompass any subset therebetween.

The acid for use in the treatment fluids described in some embodiments herein may be any acid that is capable of reacting with the fluoride releasing agents disclosed herein to generate hydrofluoric acid over time. In some embodiments, the acid may be a strong acid; a slow release acid; or any combination thereof. As used herein, the term "strong acid" refers to an acid that completely ionizes (i.e., disassociates) in a solution. As used herein, the term "slow release acid" refers to an acid that is protected (e.g., by the presence of an ester) and only ionizes upon time, temperature, and/or pH. Suitable strong acids may include, but are not limited, to hydrochloric acid; nitric acid; hydrosulfuric acid; paratoluenesulfonic acid, methanesulfonic acid, perchloric acid, hydrobromic acid; hydroiodic acid; and any combination thereof. Suitable slow release acids may include, but are not limited to, paratoluene sulfonate ester; phosphonate ester; trimethyl formate; methyl methanesulfonate; methyl trifluoroacetate; and any combination thereof. In some embodiments, the acid may be present in the treatment fluids described herein, either alone or in combination with the fluoride releasing agent(s), in the amount of a lower limit of about 1%, 1.5%, 2%, 2.5%, 3%, 3.5%, 4%, 4.5%, 5%, 5.5%, 6%, 6.5%, 7%, 7.5%, 8%, 8.5%, 9%, 10%, 10.5%, 11%, 11.5%, 12%, and 12.5% to an upper limit of about 25%, 24.5%, 24%, 23.5%, 23%, 22.5%, 22%, 21.5%, 21%, 20.5%, 20%, 19.5%, 19%, 18.5%, 18%, 17.5%, 17%, 16.5%, 16%, 15.5%, 15%, 14.5%, 14%, 13.5%, 13%, and 12.5% by volume of the treatment fluid.

The fluoride releasing agent for use in some embodiments described herein may be selected from the group consisting of an amine monofluorophosphate; a bisamine monofluorophosphate; any derivative thereof; and any combination thereof. The amine monofluorophosphate may have the formula: R—NR'$_3$$^+$PO$_3$F, wherein R is an unsaturated alkyl group comprising 8-24 carbons or an unsaturated alkenyl group comprising 8-24 carbons and R' is a hydrogen or a methyl group (—CH$_3$). The bisamine monofluorophosphate may have the formula: (R—NR'$_3$)2$^+$PO$_3$F$^{2-}$, wherein R is an unsaturated alkyl group comprising 8-24 carbons or an unsaturated alkenyl group comprising 8-24 carbons and R' is a hydrogen or a methyl group (—CH$_3$). In some embodiments, the fluoride releasing agent may be present in the treatment fluids described herein, either alone or in combination with the acid(s), in the amount of a lower limit of about 1%, 1.5%, 2%, 2.5%, 3%, 3.5%, 4%, 4.5%, 5%, 5.5%, 6%, 6.5%, 7%, 7.5%, 8%, 8.5%, 9%, 10%, 10.5%, 11%, 11.5%, 12%, and 12.5% to an upper limit of about 25%, 24.5%, 24%, 23.5%, 23%, 22.5%, 22%, 21.5%, 21%, 20.5%, 20%, 19.5%, 19%, 18.5%, 18%, 17.5%, 17%, 16.5%, 16%, 15.5%, 15%, 14.5%, 14%, 13.5%, 13%, and 12.5% by volume of the treatment fluid.

In some embodiments, the treatment fluids described herein may further comprise an additive selected from the group consisting of a salt; a weighting agent; a fluid loss control agent; an emulsifier; a dispersion aid; a corrosion inhibitor; an emulsion thinner; an emulsion thickener; a gelling agent; a surfactant; a particulate; a proppant particulate; a cutting agent; a lost circulation material; a gas; a foaming agent; a pH control additive; a breaker; a biocide; a crosslinking agent; a stabilizer; a chelating agent; a scale inhibitor; a gas hydrate inhibitor; a mutual solvent; an oxidizer; a reducer; a friction reducer; a clay stabilizing agent; and any combination thereof.

In some embodiments, the treatment fluids described herein may additionally be gelled, foamed, or both gelled and foamed. This may be particularly beneficial if the treatment fluid comprises particulates in order to more uniformly suspend the particulates while pumping the fluid into the subterranean formation. In those embodiments where the treatment fluid is gelled and/or foamed, it may be preferred to break the fluid prior to removing it from the subterranean formation. As used herein, the term "break" refers to causing a fluid to become less viscous in order to more easily remove it from a subterranean formation.

In some embodiments, the treatment fluids described herein may be gelled by including a gelling agent and, optionally, a crosslinking agent. Suitable gelling agents may comprise polymers; synthetic polymers; and any combinations thereof. A variety of gelling agents can be used in conjunction with the embodiments described herein, including, but not limited to, hydratable polymers that contain one or more functional groups such as hydroxyl; cis-hydroxyl; carboxylic acids; derivatives of carboxylic acids; sulfate; sulfonate; phosphate; phosphonate; amino; or amide. In certain embodiments, the gelling agents may be polymers comprising polysaccharides, and derivatives thereof that contain one or more of these monosaccharide units including, but not limited to, galactose; mannose; glucoside; glucose; xylose; arabinose; fructose; glucuronic acid; or pyranosyl sulfate. Examples of suitable polymers include, but are not limited to, guar gum and derivatives thereof (e.g., hydroxypropyl guar and carboxymethylhydroxypropyl guar); carboxymethyl guar; and cellulose derivatives (e.g., carboxymethyl cellulose and hydroxyethyl cellulose). Additionally, synthetic polymers and copolymers that contain the above-mentioned functional groups may be used. Examples of such synthetic polymers may include, but are not limited to, polyacrylate; polymethacrylate; polyacrylamide; polyvinyl alcohol; polyvinylpyrrolidone; and any combinations thereof. In other embodiments, the gelling agent molecule may be depolymerized. As used herein, the term "depolymerized," generally refers to a decrease in the molecular weight of the gelling agent molecule. Suitable gelling agents may be present in the treatment fluids described herein in an amount in the range of from a lower limit of about 0.1%, 0.25%, 0.5%, 0.75%, 1%, 1.25%, 1.5%, 1.75%, 2%, 2.25%, and 2.5% to an upper limit of about 5%, 4.75%, 4.5%, 4.25%, 4%, 3.75%, 3.5%, 3.25%, 3%, 2.75%, and 2.5% by weight of the treatment fluid. In preferred embodiments, the gelling agents may be present in the treatment fluids described herein in an amount in the range of from about 0.01% to about 1% by weight of the treatment fluid.

Crosslinking agents may be used to crosslink gelling agent molecules to form crosslinked gelling agents. Crosslinking agents may comprise at least one ion that is capable of crosslinking at least two gelling agent molecules. Examples of suitable crosslinking agents may include, but are not limited to, boric acid; disodium octaborate tetrahydrate; sodium diborate; pentaborates; ulexite; colemanite; compounds that can supply zirconium IV ions (e.g., zirconium lactate, zirconium lactate triethanolamine, zirconium carbonate, zirconium acetylacetonate, zirconium malate, zirconium citrate, and zirconium diisopropylamine lactate); compounds that can supply titanium IV ions (e.g., titanium lactate, titanium malate, titanium citrate, titanium ammonium lactate, titanium triethanolamine, and titanium acetylacetonate); aluminum compounds (e.g., aluminum lactate or aluminum citrate); antimony compounds; chromium compounds; iron compounds; copper compounds; zinc compounds; and any combinations thereof. Suitable crosslinking agents generally are present in the treatment fluids described herein in an amount sufficient to provide, in-situ, the desired degree of crosslinking between gelling agent molecules. In certain embodiments, the crosslinking agents may be present in an amount in the range from a lower limit of about 0.001%, 0.01%, 0.1%, 0.5%, 1%, 1.5%, 2%, 2.5%, 3%, 3.5%, 4%, 4.5%, and 5% to an upper limit of about 10%, 9.5%, 9%, 8.5%, 8%, 7.5%, 7%, 6.5%, 6%, 5.5%, and 5% by weight of the treatment fluid. In other embodiments, the crosslinking agents may be present in the treatment fluids described herein in an amount in the range from about 0.01% to about 1% by weight of the treatment fluid. Individuals skilled in the art, with the benefit of this disclosure, will recognize the exact type and amount of crosslinking agent to use depending on factors such as the specific gelling agent used, desired viscosity, formation conditions, and the like.

The gelled or gelled and crosslinked treatment fluids described herein may additionally include a gel breaker, such as an enzyme breaker; oxidizing breaker; acid buffer breaker; or temperature-activated gel breaker. The gel breakers cause the treatment fluids to revert to thin fluids that can be produced back to the surface after they have been used in a subterranean formation operation. The gel breaker may be present in the treatment fluids described herein in an amount in the range of from a lower limit of about 0.01%, 0.1%, 0.5%, 1%, 1.5%, 2%, 2.5%, 3%, 3.5%, 4%, 4.5%, and 5% to an upper limit of about 10%, 9.5%, 9%, 8.5%, 8%, 7.5%, 7%, 6.5%, 6%, 5.5%, and 5% by weight of the gelling agent.

The treatment fluids described herein may be foamed by including a gas and a foaming agent. As used herein, the term "foam" refers to a two-phase composition having a continuous liquid or solid phase and a discontinuous gas phase. Suitable gases for use in conjunction with the treatment fluids described herein may include, but are not limited to, nitrogen; carbon dioxide; air; methane; helium; argon; and any combination thereof. One skilled in the art, with the benefit of this disclosure, will understand the benefit of each gas. By way of non-limiting example, carbon dioxide foams may have deeper well capability than nitrogen foams because carbon dioxide foams have greater density than nitrogen gas foams so that the surface pumping pressure required to reach a corresponding depth is lower with carbon dioxide than with nitrogen.

In some embodiments, the gas may be present such that the treatment fluid exhibits a foam quality in the range from a lower limit of about 5%, 10%, 25%, 40%, 50%, 60%, or 70% gas volume to an upper limit of about 95%, 90%, 80%, 75%, 60%, or 50% gas volume, and wherein the foam quality of the treatment fluid may range from any lower limit to any upper limit and encompass any subset therebetween. Most preferably, the treatment fluid may have a foam quality from about 85% to about 95%, or about 90% to about 95%.

Suitable foaming agents for use in the treatment fluids described herein may include, but are not limited to, cationic foaming agents; anionic foaming agents; amphoteric foaming agents; nonionic foaming agents; or any combination thereof. Non-limiting examples of suitable foaming agents may include, but are not limited to, surfactants like betaines; sulfated alkoxylates; sulfonated alkoxylates; alkyl quaternary amines; alkoxylated linear alcohols; alkyl sulfonates; alkyl aryl sulfonates; C10-C20 alkyldiphenyl ether sulfonates; polyethylene glycols; ethers of alkylated phenol; sodium dodecylsulfate; alpha olefin sulfonates (e.g., sodium dodecane sulfonate, trimethyl hexadecyl ammonium bromide, and the like); any derivative thereof; or any combination thereof. Foaming agents may be included in treatment fluids described herein at concentrations ranging from a lower limit of about 0.05%, 0.075%, 0.1%, 0.25%, 0.5%, and 0.75% to an upper limit of about 2%, 1.75%, 1.5%, 1.25%, 1%, and 0.075% by weight of the treatment fluid.

In some embodiments, proppant particulates may be included in the treatment fluids described herein so as to create a proppant pack within a fracture in a subterranean formation. In some embodiments, the treatment fluid comprising the proppant particulates may be introduced into a subterranean formation at a rate and pressure sufficient to create or enhance at least one fracture therein and form a proppant pack within the fracture. The proppant pack may operate synergistically with the in-situ hydrofluoric acid generated in some embodiments described herein so as to enhance the conductivity of the fracture. The proppant particulates that may be used in the treatment fluids described herein may be any material, size, and shape suitable for use in a stimulation operation. In some embodiments, the proppant particulates may be substantially spherical and have a size in the range of from about 2 to about 400 mesh, or even smaller, U.S. Sieve Series. In some embodiments, the proppant particulates may have a size in the range of from about 8 to about 120 mesh, U.S. Sieve Series. In the embodiments described herein, there is no need for the proppant particulates to be sieved or screened to a particular or specific particle mesh size or particular particle size distribution, but rather a wide or broad particle size distribution can be used.

In some embodiments, it may be desirable to use substantially non-spherical proppant particulates. Suitable substantially non-spherical proppant particulates may be cubic, polygonal, fibrous, or any other non-spherical shape. Such substantially non-spherical proppant particulates may be, for example, cubic-shaped; rectangular-shaped; rod-shaped; ellipse-shaped; cone-shaped; pyramid-shaped; or cylinder-shaped. That is, in embodiments wherein the proppant particulates are substantially non-spherical, the aspect ratio of the material may range such that the material is fibrous to such that it is cubic, octagonal, or any other configuration. Substantially non-spherical proppant particulates are generally sized such that the longest axis is from about 0.02 inches to about 0.3 inches in length. In other embodiments, the longest axis is from about 0.05 inches to about 0.2 inches in length. In one embodiment, the substantially non-spherical proppant particulates are cylindrical having an aspect ratio of about 1.5 to 1 and about 0.08 inches in diameter and about 0.12 inches in length. In another embodiment, the substantially non-spherical proppant particulates are cubic having sides about 0.08 inches in length.

Suitable materials for forming the proppant particulates may include, but are not limited to, sand; bauxite; ceramic materials; thermoplastic materials; glass materials; polymer materials (e.g., ethylene vinyl acetate or composite materials); polytetrafluoroethylene materials; nut shell pieces; cured resinous particulates comprising nut shell pieces; seed shell pieces; cured resinous particulates comprising seed shell pieces; fruit pit pieces; cured resinous particulates comprising fruit pit pieces; wood; composite particulates; and combinations thereof. Suitable composite particulates may comprise a binder and a filler material wherein suitable filler materials include silica; alumina; fumed carbon; carbon black; graphite; mica; titanium dioxide; barite; metasilicate; calcium silicate; kaolin; talc; zirconia; boron; fly ash; hollow glass microspheres; solid glass; and combinations thereof. Suitable proppant particles may be any known shape of material, including substantially spherical materials; fibrous materials; polygonal materials (such as cubic materials); and combinations thereof. Proppant particulates may be present in the treatment fluids described herein in an amount from a lower limit of about 0.1 pounds per gallon (lbs/gal); 0.5 lbs/gal, 1 lbs/gal, 1.5 lbs/gal, 2 lbs/gal, 2.5 lbs/gal, 3 lbs/gal, 3.5 lbs/gal, 4 lbs/gal, 4.5 lbs/gal, and 5 lbs/gal to an upper limit of about 10 lbs/gal, 9.5 lbs/gal, 9 lbs/gal, 8.5 lbs/gal, 8 lbs/gal, 7.5 lbs/gal, 7 lbs/gal, 6.5 lbs/gal, 6 lbs/gal, 5.5 lbs/gal, and 5 lbs/gal by volume. In some embodiments, the proppant particulates may be present in the treatment fluids described herein in an amount from about 2 lbs/gal to about 6 lbs/gal by volume.

In some embodiments, a consolidating agent may be included to aid in binding individual proppant particulates together to form a proppant pack. The consolidating agent may be coated onto the proppant particulates either prior to introducing them into the treatment fluid or "on-the-fly" at the wellbore site. Suitable consolidating agents may include any consolidating agents suitable for use in stimulation operations. Non-limiting examples of suitable consolidating agents include, but are not limited to, non-aqueous tackifying agents; aqueous tackifying agents; emulsified tackifying agents; silyl-modified polyamide compounds; resins; cross-linkable aqueous polymer compositions; polymerizable organic monomer compositions; consolidating agent emulsions; zeta-potential modifying aggregating compositions; silicon-based resins; binders; any derivatives thereof; and any combinations thereof. The consolidating agent may be present in an amount from a lower limit of about 0.1%, 0.5%, 1%, 1.5%, 2%, 2.5%, 3%, 3.5%, 4%, 4.5%, and 5% to an upper limit of about 10%, 9.5%, 9%, 8.5%, 8%, 7.5%, 7%, 6.5%, 6%, 5.5%, and 5% by weight of the proppant particulates. In some embodiments, the consolidating agent may be present in an amount from about 1% to about 5% by weight of the proppant particulate. It is within the ability of one skilled in the art, with the benefit of this disclosure, to determine the need and type and amount of consolidating agent to include in the treatment fluids described herein to achieve the desired results.

In some embodiments, degradable particulates may be included in the treatments fluids having proppant particulates such that they intermix with proppant particulates and form a portion of the proppant pack. Upon a triggering event, the degradable particulates may be degraded, leaving behind spaces in the proppant pack that may enhance the conductivity of a propped fracture. It may be desirable that the degradable particulates have similar particle size, shape, and specific gravity as those of the proppant particulates. Suitable degradable particulates may include, but are not limited to, oil-degradable polymers; degradable polymers; degradable salts; blends thereof; and any combinations thereof. In some embodiments, degradable particulates may be included in the treatment fluids from a lower limit of about 1%, 1.5%, 2%, 2.5%, 3%, 3.5%, 4%, 4.5%, 5%, 5.5%, 6%, 6.5%, 7%, 7.5%, 8%, 8.5%, 9%, 9.5° % and 10% to an upper limit of about 20%, 19.5%, 19%, 18.5%, 18%, 17.5%, 17%, 16.5%, 16%, 15.5%, 15%, 14.5%, 14%, 13.5%, 13%, 12.5%, 12%, 11.5%, 11%, 10.5%, and 10% by weight of the proppant particulates. In some embodiments, degradable particulates may be included in the treatment fluids from about 15% to about 5% by weight of the proppant particulates. One of ordinary skill in the art, with the benefit of this disclosure, will recognize whether to include degradable particulates and in what concentration to achieve the desired results.

In some embodiments, the treatment fluids described herein may further comprise a cutting agent to aid in creating or enhancing fractures within a subterranean formation. The cutting agent suitable may be any proppant particulate suitable for use in a subterranean operation that is capable of withstanding the formation pressure so as to create a perforation or slot therein. Suitable cutting agents include those proppant particulates and degradable particulates described herein. The cutting agents may be present in the treatment fluids in an amount from a lower limit of about 0.1 lbs/gal, 0.5% lbs/gal, 1 lbs/gal, 1.5 lbs/gal, 2 lbs/gal, 2.5 lbs/gal, 3 lbs/gal, 3.5 lbs/gal, 4 lbs/gal, 4.5 lbs/gal, 5 lbs/gal, 5.5 lbs/gal, 6 lbs/gal, 6.5 lbs/gal, 7 lbs/gal, 7.5 lbs/gal, 8 lbs/gal, 8.5 lbs/gal, 9 lbs/gal, 9.5 lbs/gal, and 10 lbs/gal to an upper limit of about 20 lbs/gal, 19.5 lbs/gal, 19 lbs/gal, 18.5 lbs/gal, 18 lbs/gal, 17.5 lbs/gal, 17 lbs/gal, 16.5 lbs/gal, 16 lbs/gal, 15.5 lbs/gal, 15 lbs/gal, 14.5 lbs/gal, 14 lbs/gal, 13.5 lbs/gal, 13 lbs/gal, 12.5 lbs/gal, 12 lbs/gal, 11.5 lbs/gal, 11 lbs/gal, 10.5 lbs/gal, and 10 lbs/gal. In some embodiments, the cutting agents may be present in the treatment fluids in an amount from about 0.1 lbs/gal to about 15 lbs/gal. In more other embodiments, the cutting agents may be present in an amount from about 0.25 lbs/gal to about 12 lbs/gal.

In various embodiments, systems configured for preparing, transporting, and delivering the treatment fluids described herein to a downhole location are described. In various embodiments, the systems can comprise a pump fluidly coupled to a tubular (e.g., a casing, drill pipe, production tubing, coiled tubing, etc.) extending into a wellbore penetrating a subterranean formation, the tubular may be configured to circulate or otherwise convey the treatment fluids described herein. The pump may be, for example, a high pressure pump or a low pressure pump, which may depend on, inter alia, the viscosity and density of the treatment fluids, the type of the cementing operation, and the like.

In some embodiments, the systems described herein may further comprise a mixing tank arranged upstream of the pump and in which the treatment fluids is formulated. In various embodiments, the pump (e.g., a low pressure pump, a high pressure pump, or a combination thereof) may convey the treatment fluids from the mixing tank or other source of the treatment fluids to the tubular. In other embodiments, however, the treatment fluids can be formulated offsite and transported to a worksite, in which case the treatment fluids may be introduced to the tubular via the pump directly from a transport vehicle or a shipping container (e.g., a truck, a railcar, a barge, or the like) or from a transport pipeline. In yet other embodiments, the treatment fluids may be formulated on the fly at the well site where components of the treatment fluids are pumped from a transport (e.g., a vehicle or pipeline) and mixed during introduction into the tubular. In any case, the treatment fluids may be drawn into the pump, elevated to an appropriate pressure, and then introduced into the tubular for delivery downhole.

FIG. 1 shows an illustrative schematic of a system that can deliver treatment fluids of the disclosure to a downhole location, according to one or more embodiments. It should be noted that while FIG. 1 generally depicts a land-based system, it is to be recognized that like systems may be operated in subsea locations as well. As depicted in FIG. 1, system 1 may include mixing tank 10, in which a treatment fluids of the embodiments described herein may be formulated. Again, in some embodiments, the mixing tank 10 may represent or otherwise be replaced with a transport vehicle or shipping container configured to deliver or otherwise convey the treatment fluids to the well site. The treatment fluids may be conveyed via line 12 to wellhead 14, where the treatment fluids enters tubular 16 (e.g., a casing, drill pipe, production tubing, coiled tubing, etc.), tubular 16 extending from wellhead 14 into wellbore 22 penetrating subterranean formation 18. Upon being ejected from tubular 16, the treatment fluids may subsequently return up the wellbore in the annulus between the tubular 16 and the wellbore 22 as indicated by flow lines 24. In other embodiments, the treatment fluids may be reverse pumped down through the annulus and up tubular 16 back to the surface, without departing from the scope of the disclosure. Pump 20 may be configured to raise the pressure of the treatment fluids to a desired degree before its introduction into tubular 16 (or annulus). It is to be recognized that system 1 is merely exemplary in nature and various additional components may be present that have not necessarily been depicted in FIG. 1 in the interest of clarity. Non-limiting additional components that may be present include, but are not limited to, supply hoppers, valves, condensers, adapters, joints, gauges, sensors, compressors, pressure controllers, pressure sensors, flow rate controllers, flow rate sensors, temperature sensors, and the like.

One skilled in the art, with the benefit of this disclosure, should recognize the changes to the system described in FIG. 1 to provide for other cementing operations (e.g., squeeze operations, reverse cementing (where the cement in introduced into an annulus between a tubular and the wellbore and returns to the wellhead through the tubular), and the like).

It is also to be recognized that the disclosed treatment fluids may also directly or indirectly affect the various downhole equipment and tools that may come into contact with the treatment fluids during operation. Such equipment and tools may include, but are not limited to, wellbore casing, wellbore liner, completion string, insert strings, drill string, coiled tubing, slickline, wireline, drill pipe, drill collars, mud motors, downhole motors and/or pumps, surface-mounted motors and/or pumps, centralizers, turbolizers, scratchers, floats (e.g., shoes, collars, valves, etc.), wellbore projectiles (e.g., wipers, plugs, darts, balls, etc.), logging tools and related telemetry equipment, actuators (e.g., electromechanical devices, hydromechanical devices, etc.), sliding sleeves, production sleeves, plugs, screens, filters, flow control devices (e.g., inflow control devices, autonomous inflow control devices, outflow control devices, etc.), couplings (e.g., electro-hydraulic wet connect, dry connect, inductive coupler, etc.), control lines (e.g., electrical, fiber optic, hydraulic, etc.), surveillance lines, drill bits and reamers, sensors or distributed sensors, downhole heat exchangers, valves and corresponding actuation devices, tool seals, packers, cement plugs, bridge plugs, and other wellbore isolation devices, or components, and the like. Any of these components may be included in the systems generally described above and depicted in FIG. 1.

Embodiments disclosed herein include:

A. A method comprising: introducing a treatment fluid into a subterranean formation, wherein the treatment fluid comprises a base fluid, an acid, and a fluoride releasing agent selected from the group consisting of an amine monofluorophosphate; a bisamine monofluorophosphate; any derivative thereof; and any combination thereof, wherein the acid and the fluoride releasing agent react to generate hydrofluoric acid over time in the subterranean formation so as to create or enhance at least one microfracture therein.

B. A method comprising: introducing a treatment fluid into a subterranean formation at a rate and pressure sufficient to create or enhance at least one fracture therein, wherein the treatment fluid comprises a base fluid, an acid, and a fluoride releasing agent selected from the group consisting of an amine monofluorophosphate; a bisamine monofluorophosphate; any derivative thereof; and any combination thereof, wherein the acid and the fluoride releasing agent react to generate hydrofluoric acid over time in the subterranean formation so as to create or enhance at least one microfracture therein.

C. A method comprising: providing a first treatment fluid comprising a base fluid and an acid; providing a second treatment fluid comprising a base fluid and a fluoride releasing agent selected from the group consisting of an amine monofluorophosphate; a bisamine monofluorophosphate; any derivative thereof; and any combination thereof, providing a hydrojetting tool connected to a tubular member within a subterranean formation, so as to create an annulus between the tubular member and the subterranean formation; introducing one of the first treatment fluid or the second treatment fluid into the subterranean formation through the hydrojetting tool and introducing the other of the first treatment fluid or the second treatment fluid into the subterranean formation through the annulus; contacting the first treatment fluid and the second treatment fluid at a treatment interval in the subterranean formation; and reacting the acid and the fluoride releasing agent and generate hydrofluoric acid over time at the treatment interval in the subterranean formation so as to create or enhance at least one microfracture therein.

Each of embodiments A and B may have one or more of the following additional elements in any combination:

Element 1: Wherein the amine monofluorophosphate has the formula: R—NR'$_3$$^+$PO$_3$F, wherein R is an unsaturated alkyl group comprising 8-24 carbons or an unsaturated alkenyl group comprising 8-24 carbons and R' is a hydrogen or a methyl group.

Element 2: Wherein the bisamine monofluorophosphate has the formula: (R—NR'$_3$)$_2$$^+$PO$_3$F$^{2-}$, wherein R is an unsaturated alkyl group comprising 8-24 carbons or an unsaturated alkenyl group comprising 8-24 carbons and R' is a hydrogen or a methyl group.

Element 3: Wherein the acid is a strong acid selected from the group consisting of hydrochloric acid; nitric acid; hydrosulfuric acid; para-toluenesulfonic acid, methanesulfonic acid, perchloric acid, hydrobromic acid; hydroiodic acid; and any combination thereof.

Element 4: Wherein the acid is a slow release acid selected from the group consisting of paratoluene sulfonate ester; phosphonate ester; trimethyl formate; methyl methanesulfonate; methyl trifluoroacetate; and any combination thereof.

Element 5: Wherein the treatment fluid further comprises a salt; a weighting agent; a fluid loss control agent; an emulsifier; a dispersion aid; a corrosion inhibitor; an emulsion thinner; an emulsion thickener; a gelling agent; a surfactant; a particulate; a proppant particulate; a cutting agent; a lost circulation material; a gas; a foaming agent; a pH control additive; a breaker; a biocide; a crosslinking agent; a stabilizer; a chelating agent; a scale inhibitor; a gas hydrate inhibitor; a mutual solvent; an oxidizer; a reducer; a friction reducer; a clay stabilizing agent; and any combination thereof.

Element 6: Wherein the first treatment fluid and/or the second treatment fluid further comprises a salt; a weighting agent; a fluid loss control agent; an emulsifier; a dispersion aid; a corrosion inhibitor; an emulsion thinner; an emulsion thickener; a gelling agent; a surfactant; a particulate; a proppant particulate; a cutting agent; a lost circulation material; a gas; a foaming agent; a pH control additive; a breaker; a biocide; a crosslinking agent; a stabilizer; a chelating agent; a scale inhibitor; a gas hydrate inhibitor; a mutual solvent; an oxidizer; a reducer; a friction reducer; a clay stabilizing agent; and any combination thereof.

Element 7: Wherein the step of: introducing one of the first treatment fluid or the second treatment fluid into the subterranean formation through the hydrojetting tool is performed at a rate and pressure sufficient to create or enhance at least one fracture in the subterranean formation.

Element 8: Wherein the steps of: contacting the first treatment fluid and the second treatment fluid at a treatment interval in the subterranean formation, and reacting the acid and the fluoride releasing agent and generate hydrofluoric acid over time at the treatment interval in the subterranean formation so as to create or enhance at least one microfracture therein are repeated at at least a second treatment interval in the subterranean formation.

By way of non-limiting example, exemplary combinations applicable to A and B include: A with 1, 3, and 5; B with 3, 4, and 5; C with 2, 6, 7, and 8.

Therefore, the embodiments disclosed herein are well adapted to attain the ends and advantages mentioned as well as those that are inherent therein. The particular embodiments disclosed above are illustrative only, as they may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope and spirit of the present disclosure. The embodiments illustratively disclosed herein suitably may be practiced in the absence of any element that is not specifically disclosed herein and/or any optional element disclosed herein. While compositions and methods are described in terms of "comprising," "containing," or "including" various components or steps, the compositions and methods can also "consist essentially of" or "consist of" the various components and steps. All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the element that it introduces. If there is any conflict in the usages of a word or term in this specification and one or more patent or other documents that may be incorporated herein by reference, the definitions that are consistent with this specification should be adopted.

The invention claimed is:

1. A method comprising:
   introducing a treatment fluid into a subterranean formation,
      wherein the treatment fluid comprises a base fluid, an acid, and a fluoride releasing agent selected from the group consisting of an amine monofluorophosphate; a bisamine monofluorophosphate; any derivative thereof; and any combination thereof,
      wherein the acid and the fluoride releasing agent react to generate hydrofluoric acid over time in the subterranean formation so as to create or enhance at least one microfracture therein.

2. The method of claim 1, wherein the amine monofluorophosphate has the formula: $R-NR'_3{}^+PO_3F$, wherein R is an unsaturated alkyl group comprising 8-24 carbons or an unsaturated alkenyl group comprising 8-24 carbons and R' is a hydrogen or a methyl group.

3. The method of claim 1, wherein the bisamine monofluorophosphate has the formula: $(R-NR'_3)_2{}^+PO_3F^{2-}$, wherein R is an unsaturated alkyl group comprising 8-24 carbons or an unsaturated alkenyl group comprising 8-24 carbons and R' is a hydrogen or a methyl group.

4. The method of claim 1, wherein the acid is a strong acid selected from the group consisting of hydrochloric acid; nitric acid; hydrosulfuric acid; para-toluenesulfonic acid, methanesulfonic acid, perchloric acid, hydrobromic acid; hydroiodic acid; and any combination thereof.

5. The method of claim 1, wherein the acid is a slow release acid selected from the group consisting of paratoluene sulfonate ester; phosphonate ester; trimethyl formate; methyl methanesulfonate; methyl trifluoroacetate; and any combination thereof.

6. The method of claim 1, wherein the treatment fluid further comprises a salt; a weighting agent; a fluid loss control agent; an emulsifier; a dispersion aid; a corrosion inhibitor; an emulsion thinner; an emulsion thickener; a gelling agent; a surfactant; a particulate; a proppant particulate; a cutting agent; a lost circulation material; a gas; a foaming agent; a pH control additive; a breaker; a biocide; a crosslinking agent; a stabilizer; a chelating agent; a scale inhibitor; a gas hydrate inhibitor; a mutual solvent; an oxidizer; a reducer; a friction reducer; a clay stabilizing agent; and any combination thereof.

7. A method comprising:
   introducing a treatment fluid into a subterranean formation at a rate and pressure sufficient to create or enhance at least one fracture therein,
      wherein the treatment fluid comprises a base fluid, an acid, and a fluoride releasing agent selected from the group consisting of an amine monofluorophosphate; a bisamine monofluorophosphate; any derivative thereof; and any combination thereof, wherein the acid and the fluoride releasing agent react to generate hydrofluoric acid over time in the subterranean formation so as to create or enhance at least one microfracture therein.

8. The method of claim 7, wherein the amine monofluorophosphate has the formula: R—NR'$_3$$^+$PO$_3$F, wherein R is an unsaturated alkyl group comprising 8-24 carbons or an unsaturated alkenyl group comprising 8-24 carbons and R' is a hydrogen or a methyl group.

9. The method of claim 7, wherein the bisamine monofluorophosphate has the formula: (R—NR'$_3$)$_2$$^+$PO$_3$F$^{2-}$, wherein R is an unsaturated alkyl group comprising 8-24 carbons or an unsaturated alkenyl group comprising 8-24 carbons and R' is a hydrogen or a methyl group.

10. The method of claim 7, wherein the acid is a strong acid selected from the group consisting of hydrochloric acid; nitric acid; hydrosulfuric acid; para-toluenesulfonic acid, methanesulfonic acid, perchloric acid, hydrobromic acid; hydroiodic acid; and any combination thereof.

11. The method of claim 7, wherein the acid is a slow release acid selected from the group consisting of paratoluene sulfonate ester; phosphonate ester; trimethyl formate; methyl methanesulfonate; methyl trifluoroacetate; and any combination thereof.

12. The method of claim 7, wherein the treatment fluid further comprises a salt; a weighting agent; a fluid loss control agent; an emulsifier; a dispersion aid; a corrosion inhibitor; an emulsion thinner; an emulsion thickener; a gelling agent; a surfactant; a particulate; a proppant particulate; a cutting agent; a lost circulation material; a gas; a foaming agent; a pH control additive; a breaker; a biocide; a crosslinking agent; a stabilizer; a chelating agent; a scale inhibitor; a gas hydrate inhibitor; a mutual solvent; an oxidizer; a reducer; a friction reducer; a clay stabilizing agent; and any combination thereof.

13. A method comprising:
providing a first treatment fluid comprising a base fluid and an acid;
providing a second treatment fluid comprising a base fluid and a fluoride releasing agent selected from the group consisting of an amine monofluorophosphate; a bisamine monofluorophosphate; any derivative thereof; and any combination thereof,
providing a hydrojetting tool connected to a tubular member within a subterranean formation, so as to create an annulus between the tubular member and the subterranean formation;
introducing one of the first treatment fluid or the second treatment fluid into the subterranean formation through the hydrojetting tool and introducing the other of the first treatment fluid or the second treatment fluid into the subterranean formation through the annulus;
contacting the first treatment fluid and the second treatment fluid at a treatment interval in the subterranean formation; and
reacting the acid and the fluoride releasing agent and generate hydrofluoric acid over time at the treatment interval in the subterranean formation so as to create or enhance at least one microfracture therein.

14. The method of claim 13, wherein the amine monofluorophosphate has the formula: R—NR'$_3$$^+$PO$_3$F, wherein R is an unsaturated alkyl group comprising 8-24 carbons or an unsaturated alkenyl group comprising 8-24 carbons and R' is a hydrogen or a methyl group.

15. The method of claim 13, wherein the bisamine monofluorophosphate has the formula: (R—NR'$_3$)$_2$$^+$PO$_3$F$^{2-}$, wherein R is an unsaturated alkyl group comprising 8-24 carbons or an unsaturated alkenyl group comprising 8-24 carbons and R' is a hydrogen or a methyl group.

16. The method of claim 13, wherein the acid is a strong acid selected from the group consisting of hydrochloric acid; nitric acid; hydrosulfuric acid; para-toluenesulfonic acid, methanesulfonic acid, perchloric acid, hydrobromic acid; hydroiodic acid; and any combination thereof.

17. The method of claim 13, wherein the acid is a slow release acid selected from the group consisting of paratoluene sulfonate ester; phosphonate ester; trimethyl formate; methyl methanesulfonate; methyl trifluoroacetate; and any combination thereof.

18. The method of claim 13, wherein the first treatment fluid and/or the second treatment fluid further comprises a salt; a weighting agent; a fluid loss control agent; an emulsifier; a dispersion aid; a corrosion inhibitor; an emulsion thinner; an emulsion thickener; a gelling agent; a surfactant; a particulate; a proppant particulate; a cutting agent; a lost circulation material; a gas; a foaming agent; a pH control additive; a breaker; a biocide; a crosslinking agent; a stabilizer; a chelating agent; a scale inhibitor; a gas hydrate inhibitor; a mutual solvent; an oxidizer; a reducer; a friction reducer; a clay stabilizing agent; and any combination thereof.

19. The method of claim 13, wherein the step of: introducing one of the first treatment fluid or the second treatment fluid into the subterranean formation through the hydrojetting tool is performed at a rate and pressure sufficient to create or enhance at least one fracture in the subterranean formation.

20. The method of claim 13, wherein the steps of: contacting the first treatment fluid and the second treatment fluid at a treatment interval in the subterranean formation, and reacting the acid and the fluoride releasing agent and generate hydrofluoric acid over time at the treatment interval in the subterranean formation so as to create or enhance at least one microfracture therein are repeated at at least a second treatment interval in the subterranean formation.

\* \* \* \* \*